(No Model.) 2 Sheets—Sheet 1.
G. C. ANTHONI.
SYSTEM FOR THE ISOLATION OF BUILDINGS, &c.
No. 440,938. Patented Nov. 18, 1890.
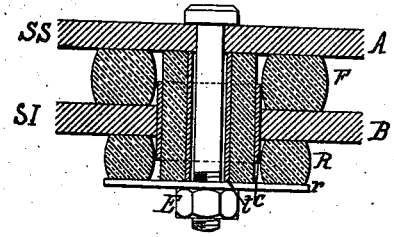
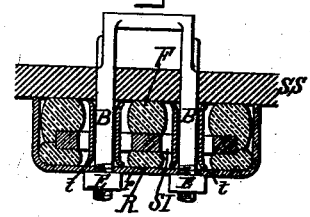
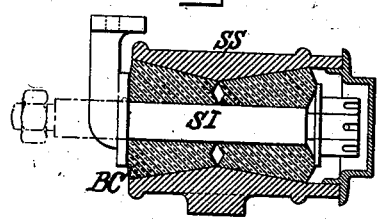
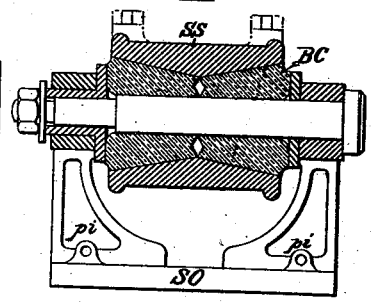
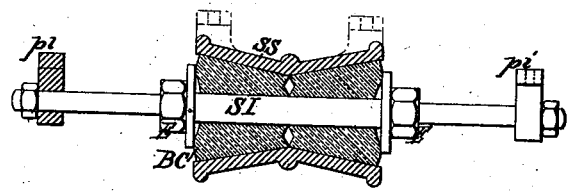
WITNESSES:
George Baumann
John Revell
INVENTOR
Gustave Charles Anthoni
BY
Howson and Howson
his ATTORNEYS (No Model.) 2 Sheets—Sheet 2.
G. C. ANTHONI.
SYSTEM FOR THE ISOLATION OF BUILDINGS, &c.
No. 440,938. Patented Nov. 18, 1890.
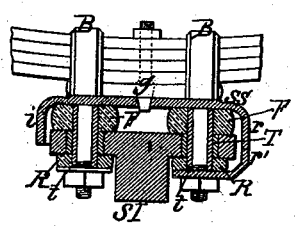
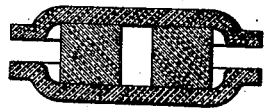
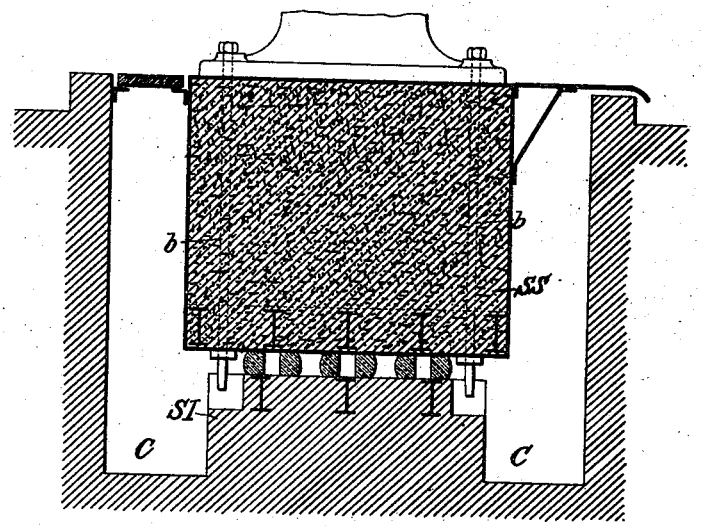
WITNESSES:
George Baumann
John Revell
INVENTOR
Gustave Charles Anthoni
BY
Howson and Howson
his ATTORNEYS

UNITED STATES PATENT OFFICE.

GUSTAVE CHARLES ANTHONI, OF LEVALLOIS-PERRET, FRANCE.

SYSTEM FOR THE ISOLATION OF BUILDINGS, &c.

SPECIFICATION forming part of Letters Patent No. 440,938, dated November 18, 1890.

Application filed August 13, 1888. Serial No. 282,697. (No model.) Patented in England June 15, 1888, No. 8,796.

*To all whom it may concern:*

Be it known that I, GUSTAVE CHARLES ANTHONI, residing at Levallois-Perret, in the Department of Seine, in the Republic of France, have invented a System of Complete Isolation of Buildings and other Constructions, Machines, Vehicles, and Apparatus of all Kinds, with the object of deadening vibrations and shocks, (for which Letters Patent of Great Britain, dated June 15, 1888, No. 8,796, and sealed October 26, 1888, were granted to me,) of which the following is a specification.

This invention relates to a system of complete isolation of constructions, machines, vehicles, and apparatus of all kinds with the object of deadening vibrations and shocks. Rubber simply interposed between two parts to isolate one from the other has been employed for a long time to deaden shocks and vibrations.

The object of my invention is to construct an adjustable isolated fastening which will hold the two parts in their relative positions to each other and still permit the free action of the rubber.

In the accompanying drawings, Figure 1 is a cross-section of an isolated fastening according to my invention, where a single bolt is used. Fig. 2 is a similar view where a strap is used. Figs. 3, 4, and 5 are sections of fastenings showing a different shape of rubber. Figs. 6 and 7 show the application of the fastenings, and Fig. 8 is a detail relating to Fig. 7. Throughout the drawings S S indicate upper and S I lower surfaces.

To obtain complete isolation of two pieces tied together by elastic and isolating fastenings, these latter must be firmly fixed to one of the pieces, so that they are as of one piece therewith, and they must then be completely isolated from the other piece.

The principal ties or fastenings are the isolated bolt fixed at one end, Figs. 1 and 3, or both ends, Figs. 4 and 5, or the stirrup, Fig. 2, isolated by a tube and two washers, or by one or two cones of india-rubber, Figs. 4 and 5. Whatever may be the shape of the piece of india-rubber, it is necessary in inserting it between the rigid parts to insure its free expansion and to give it a thickness sufficient to prevent its flattening under the action of the shock. It is also useful in certain applications to protect it by a covering against the action of oil or other agents which might injure it. The isolated bolt joins the two pieces together while leaving to the india-rubber all its elasticity.

To isolate the bolt from the piece which it is to attach, an isolating-tube of india-rubber *t* is interposed, then two plugs, pads, or washers of india-rubber at the two ends of the bolt. The first or foundation washer F is placed between the two parts to be isolated, and is calculated to support the weight. The second or reaction washer R is placed between the piece to be isolated and the washer of the nut. This india-rubber washer deadens the shock due to the reaction which follows the flattening and which without it would break the bolt. The reaction-washer may be thinner than the foundation-washer because it has less to support. Covers *r* and *r'* spread the pressure over the two india-rubber washers and protect them from oil or dirt. The piece thus isolated may move in every direction without ever meeting the bolt or its nut.

To exactly limit the squeezing or compression of the india-rubber, the tightening up of the nut must be limited, either by screwing the nut E close up to its washer *r*, and on the shoulder limiting the screw-thread of the bolt, or, which is preferable, by the use of a tie or cross-tube, Figs. 1, 2, and 6, placed around the bolt, the stems of the strap or the screw, and within the isolating india-rubber tube. It is then certain that the fitter cannot make a mistake and will be compelled to give the determined tightening. This cross-tube is of sufficient strength to resist the pressure of the nut, which may therefore be firmly tightened close up. Further, it absolutely prevents the nut or the head of the bolt from starting back against the piece to be isolated, which may happen with the limited screw-thread. The bolt is securely fixed to one of the pieces in various ways—by riveting, by screwing it close against its shoulder with a shoulder or collar and counter-nut, or with the cross-tube, which is the simplest means. The strap is fixed in like manner by two cross-